No. 659,908. Patented Oct. 16, 1900.
B. K. APPLEMAN.
ANTISLIPPING ATTACHMENT FOR VEHICLE WHEELS.
(Application filed Feb. 14, 1900.)
(No Model.)
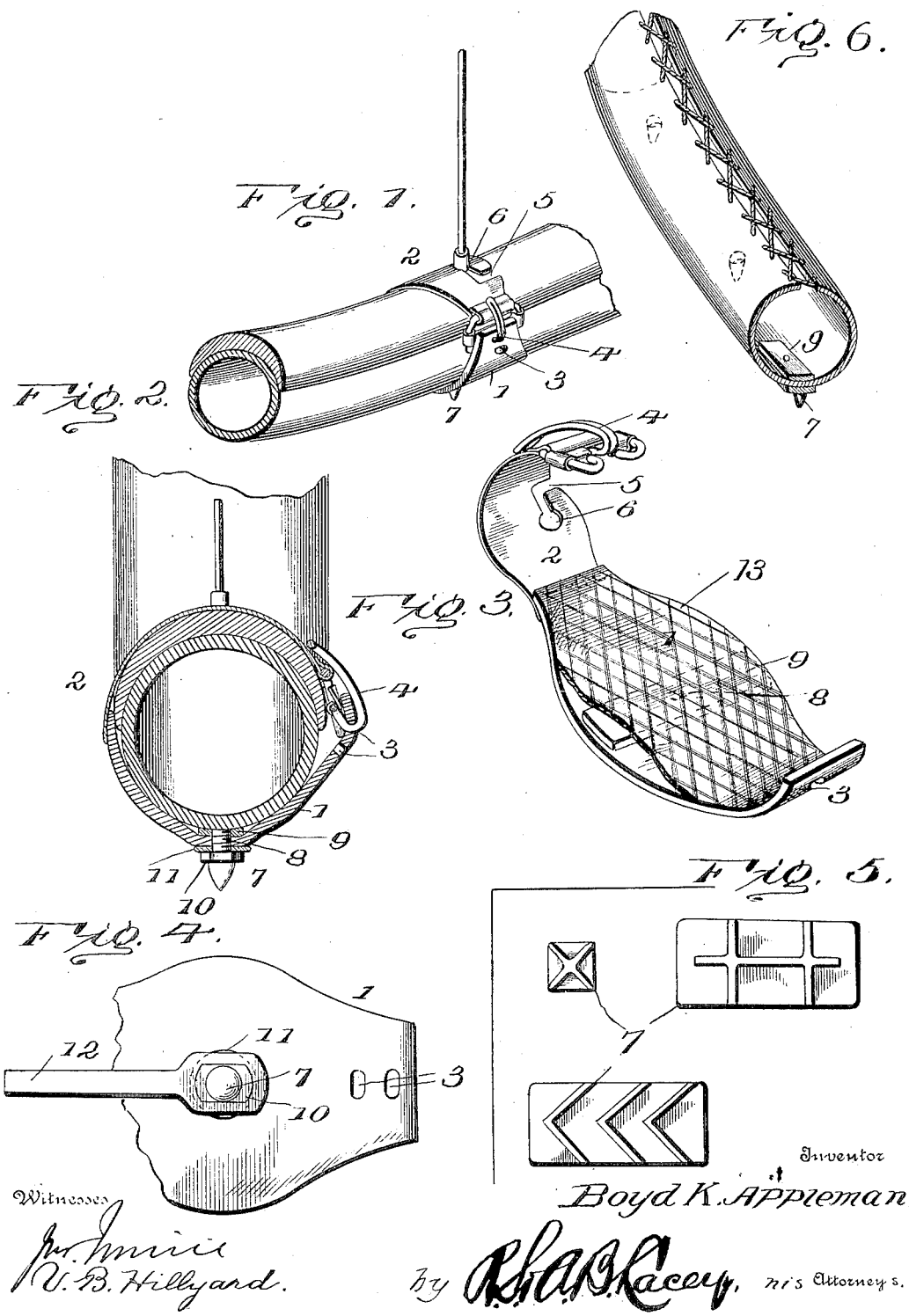
Witnesses
Inventor
Boyd K. Appleman,
by R. S. & A. B. Lacey, his Attorneys.

UNITED STATES PATENT OFFICE.

BOYD K. APPLEMAN, OF ROHRSBURG, PENNSYLVANIA.

ANTISLIPPING ATTACHMENT FOR VEHICLE-WHEELS.

SPECIFICATION forming part of Letters Patent No. 659,908, dated October 16, 1900.

Application filed February 14, 1900. Serial No. 5,160. (No model.)

*To all whom it may concern:*

Be it known that I, BOYD K. APPLEMAN, a citizen of the United States, residing at Rohrsburg, in the county of Columbia and State of Pennsylvania, have invented certain new and useful Improvements in Antislipping Attachments for Vehicle Drive-Wheels; and I do hereby declare the following to be a full, clear, and exact description of the invention, such as will enable others skilled in the art to which it appertains to make and use the same.

Considerable difficulty is met with in securing proper traction for the drive-wheels on bicycles, velocipedes, automobiles, and similar mechanically-propelled road-vehicles when the ground is covered with ice or snow or when the surface is muddy. This is due to the slipping of the wheels upon the surface. This invention aims to meet this objectionable feature by providing a device which can be readily applied to and detached from the tire of the wheel. In slippery weather— that is, when the ground is muddy or covered with ice and snow—the device is resorted to and fitted to the wheel, and when the surface assumes its normal condition, so as to enable the wheel to operate without slipping, the device is removed.

Generally stated, the invention consists of a binder to be secured about the tire and rim of the wheel and provided with means to make positive engagement with the surface, said engaging means consisting of a calk of desired formation, according to the caprice of the designer or manufacturer.

For a full description of the invention and the merits thereof, and also to acquire a knowledge of the details of construction of the means for effecting the result, reference is to be had to the following description and the drawings hereto attached.

While the essential characteristic features of the invention are necessarily susceptible of modification, still the preferred embodiment of the invention is illustrated in the accompanying drawings, in which—

Figure 1 is a perspective view of a portion of a vehicle-wheel rim, showing the application of the invention. Fig. 2 is a transverse section thereof. Fig. 3 is a perspective view of the device disassociated from the vehicle-wheel and showing a lining applied thereto. Fig. 4 is a detail view showing the manner of placing a calk in position or removing it from the binder. Fig. 5 shows some of the many forms of calks devised for use in connection with the device. Fig. 6 is a detail view of a modification, showing the binder in the form of a sheath or casing.

Corresponding and like parts are referred to in the following description and indicated in all the views of the drawings by the same reference characters.

The binder is adapted to encompass the tire and rim of the vehicle-wheel and may be of any longitudinal extent, it being contemplated in one of the many forms of the invention to construct the same as a sheath or casing to completely envelop the tire and rim. The binder is detachably fitted to the rim portion of the vehicle-wheel to enable its use only as occasion may require—that is, when the surface is slippery or of such a nature as to prevent the drive-wheels making proper contact therewith—so as to obviate slipping.

The binder preferably consists of a textile portion 1 and a metallic portion 2, the former being designed to pass around and come in contact with the tire of the wheel and the latter being intended to extend over and come in contact with the rim or felly of the wheel. The parts 1 and 2 are rigidly attached at one end and are adapted to be adjustably connected at their opposite ends, so as to admit of the device being firmly attached to the rim portion of the vehicle-wheel of any diametrical extent. The free end portion of the part 1 is formed with a series of openings 3, and the corresponding end of the part 2 is provided with a buckle 4 for coöperation with the openings 3, so as to secure the binder when fitted about the rim portion of the wheel. To prevent relative slipping of the device when in position, the part 2 is formed with an opening 5 to receive the spoke of the wheel, and a bayonet-slot 6 extends from the opening 5 through an edge of the plate 2, so as to admit of the spoke having ingress and egress with reference to the opening 5 when placing the device in position or removing it from the vehicle-wheel.

A calk 7 is secured to the binder at a point to come opposite the tread portion of the wheel and is designed to make positive engagement with the surface and prevent the wheel from slipping. This calk may be of any formation, and its outer or active portion may consist of a single spur or a series of intersecting ribs relatively disposed, according to the desired design. The calk is detachably fitted to the binder, and for this purpose is formed with a threaded stem or shank 8, which passes through an opening in the binder and makes screw-thread connection with a plate 9, located upon the inner side of the binder. The base portion 10 of the calk abuts against a washer or plate 11, placed against the outer side of the binder, and is adapted to receive a wrench 12 or similar tool, by means of which the calk can be tightened and loosened. It is not necessary in all forms of the calk to interpose a washer or plate, as 11, between the base 10 and the binder, since a form of calk having a broad base 10 does not require the employment of the part 11, which latter is necessary when the base 10 is of relatively small area in order to prevent it from wearing or forcing its way through the binder.

By having the outer or tread portion of the binder constructed of textile injurious contact with the tire of the wheel is obviated, and by having the inner part 2 formed of metal the necessity of reinforcing the spoke-opening 5 is obviated. To further assist in preventing slipping of the binder, its tread portion is lined with rubber 13, which is roughened or corrugated, as shown in Fig. 3.

Having thus described the invention, what is claimed as new, and desired to be secured by Letters Patent, is—

1. An antislipping device to be applied to the rims of mechanically-propelled vehicles, the same consisting of a metallic rim-engaging portion having a spoke-receiving opening and a bayonet-slot leading from said opening through an edge thereof, a flexible tread portion attached at one end to the rim portion and having a calk or engaging device, and means for adjustably connecting the outer ends of the rim and tread portions, substantially as specified.

2. An antislipping device for the purpose described, comprising a flexible tread portion provided with an engaging device, and an inflexible rim portion rigidly connected at one end to one terminal of the flexible portion, and provided at its opposite end with means for adjustably engaging the free terminal of said tread portion, and having intermediate means for engaging a spoke to hold the binder against lateral and longitudinal displacement, substantially as described.

3. An antislipping device for the purpose described, comprising a tread portion of textile having a calk or engaging device, and a metallic portion rigidly connected at one end to a terminal portion of the textile and provided at its opposite ends with means for making positive and adjustable connection with the other or free end of said textile, substantially as described.

4. An antislipping device for the purpose described, comprising a tread portion of textile, a calk or engaging device connected thereto, a lining upon the inner side of said tread portion to frictionally bear upon the tread of the tire, and a metallic rim portion rigidly connected at one end to one terminal of the flexible portion, and provided at its opposite end with means for adjustably engaging the free terminal of said tread portion, and having intermediate means for engaging a spoke to hold the binder against lateral and longitudinal displacement, substantially as described.

5. An antislipping device, comprising a binder, plates fitted against opposite sides of the binder, and a calk having a threaded stem passing through the outermost plate and binder and making screw-thread connection with the inner plate and having a base portion to overlap the outer plate, substantially as and for the purpose set forth.

In testimony whereof I affix my signature in presence of two witnesses.

BOYD K. APPLEMAN. [L. S.]

Witnesses:
R. R. ZARR,
H. H. HENRIE.